United States Patent
Tennant et al.

(10) Patent No.: US 9,332,103 B2
(45) Date of Patent: May 3, 2016

(54) USER PROTECTION IN A MULTIMODE PERSONAL COMMUNICATION DEVICE

(71) Applicant: HARRIS CORPORATION, Melbourne, FL (US)

(72) Inventors: Bryce Tennant, Rochester, NY (US); Kenton Weigold, Henrietta, NY (US); Thomas Warsaw, West Henrietta, NY (US)

(73) Assignee: Harris Corporation, Melbourne, FL (US)

( * ) Notice: Subject to any disclaimer, the term of this patent is extended or adjusted under 35 U.S.C. 154(b) by 115 days.

(21) Appl. No.: 14/161,857

(22) Filed: Jan. 23, 2014

(65) Prior Publication Data

US 2015/0207910 A1 Jul. 23, 2015

(51) Int. Cl.
*H04M 1/60* (2006.01)
*H04W 52/38* (2009.01)
*H04R 3/00* (2006.01)
*H04W 88/02* (2009.01)

(52) U.S. Cl.
CPC ............. *H04M 1/6033* (2013.01); *H04R 3/007* (2013.01); *H04W 52/38* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 5,572,575 | A * | 11/1996 | Yamamoto et al. | 455/412.1 |
| 2001/0033647 | A1* | 10/2001 | Veschi | 379/372 |
| 2002/0126832 | A1* | 9/2002 | Somma | 379/399.01 |
| 2003/0032439 | A1* | 2/2003 | Harris | H04W 52/20 455/517 |
| 2008/0137873 | A1 | 6/2008 | Goldstein | |
| 2008/0304636 | A1* | 12/2008 | Souluer | 379/88.17 |
| 2009/0023479 | A1* | 1/2009 | Hulvey | 455/569.1 |
| 2010/0167800 | A1* | 7/2010 | Wakizaka et al. | 455/575.1 |
| 2010/0246807 | A1 | 9/2010 | Kemmochi et al. | |
| 2012/0045990 | A1* | 2/2012 | Sandell | 455/41.2 |
| 2012/0140933 | A1 | 6/2012 | Sherwood et al. | |
| 2013/0076491 | A1* | 3/2013 | Brandsma et al. | 340/10.3 |
| 2013/0101125 | A1 | 4/2013 | Peters et al. | |
| 2014/0270284 | A1* | 9/2014 | Luna | 381/303 |

FOREIGN PATENT DOCUMENTS

EP 1 696 695 A1 8/2006

* cited by examiner

*Primary Examiner* — Ashish K Thomas
(74) *Attorney, Agent, or Firm* — Fox Rothschild, LLP; Robert J. Sacco; Carol E. Thorstad-Forsyth

(57) ABSTRACT

Portable communication device (100) generates a telephony audio stream and at least a second audio stream. Responsive to the occurrence of a telephony session, the second audio stream is re-routed from a loudspeaker (234) to a handset speaker (230) in the PCD (100) having a low capacity audio output capability. Upon termination of the telephony session, the second audio stream is re-routed from the handset speaker (230) to the loudspeaker (234). Subsequent to such re-routing, an audio output drive level of the second audio stream is caused to gradually increase over a period of time in accordance with a predetermined ramp function. A series of warning tones are reproduced to warn the user of the potential for high volume audio.

22 Claims, 5 Drawing Sheets

USER PROTECTION IN A MULTIMODE PERSONAL COMMUNICATION DEVICE

BACKGROUND OF THE INVENTION

1. Statement of the Technical Field

The inventive arrangements relate to protective systems for electronic devices, and more particularly to systems designed to protect users of multimode communication devices from potentially dangerous outputs.

2. Description of the Related Art

Multimedia devices, such as mobile phones and mobile computing devices with telephone functionality, are often configured to produce an acoustic output. Acoustic shock is a temporary or permanent disturbance of the functioning of the ear or of the nervous system that may be caused to a user of a telephone earphone by a sudden sharp rise in the acoustic pressure produced by the device. Various methods and systems have been suggested for reducing the risk of acoustic shock. One solution involves the use of two separate speakers. A large high output power speaker is used for ringing tones, signaling tones, and hands-free phone operation. A smaller, lower output power, speaker is used during normal telephone calls where the device is held to the user's ear. In such systems, the large, high-power speaker is commonly positioned in or on the device at a location which is spaced apart from the smaller speaker so that the larger speaker is not too close the user's ear during normal phone conversations. For example, the output of the larger speaker can be emitted from a side of the device opposed to the side where the output of the smaller speaker is emitted. Alternatively, the larger speaker can be positioned at an end of the device opposed from the end where the smaller earphone speaker is located. With the foregoing arrangements, the user can place the portion of the device containing the smaller speaker directly adjacent to their ear, while minimizing the risk that an unexpected output (ringing or hand-free phone audio) from the larger, more powerful speaker, will cause acoustic shock.

Another solution to the problem involves selectively controlling the output power of the larger, higher power, speaker so that its sound pressure output is slowly ramped up over a period of time. Certain improvements to this approach have been suggested in EP 1,696,695 whereby ramping is temporarily suspended during periods of time when audio output is momentarily silent. Other solutions to the problem involve sensors and control software which are intended to help the device determine when it is positioned at a location adjacent to a human ear.

SUMMARY OF THE INVENTION

Embodiments of the invention concern method and system for user protection in a portable communication device (PCD). The PCD includes one or more processing devices which are configured to generate in the PCD a plurality of audio streams including a telephony audio stream and at least a second audio stream. The one or more processing devices are arranged to cause the second audio stream to be reproduced using a loudspeaker in the PCD having a high capacity audio output capability. Responsive to the occurrence of a telephony session, the second audio stream is re-routed from the loudspeaker to a handset speaker in the PCD having a low capacity audio output capability. Accordingly, the second audio stream and the telephony audio stream are reproduced during the telephony session using the handset speaker. Upon termination of the telephony session, the second audio stream is re-routed from the handset speaker to the loudspeaker. Subsequent to such re-routing, an audio output drive level of the second audio stream is caused to gradually increase over a period of time in accordance with a predetermined ramp function.

The audio output drive level is increased until the audio output drive level of the second audio stream corresponds with the predetermined output drive level setting for the second audio stream. According to one aspect of the invention, the at least one processor will cause the loudspeaker to selectively reproduce a series of warning tones at a tone audio output drive level determined by the predetermined ramp function. These tones are reproduced during the period of time while the audio output drive level is being gradually increased. According to another aspect of the invention, the PCD is configured to reduce a maximum allowed RF transmit power level of at least one transmitter included in the PCD during the telephony session, and to gradually increase the maximum allowed RF transmit power level upon termination of the telephony session.

The invention also concerns a method for protecting a user from RF energy associated with a portable communication device (PCD). The method involves generating in the PCD at least one audio stream and reproducing the at least one audio stream using a loudspeaker in the PCD having a high capacity audio output capability. Thereafter, responsive to the initiation of a listening session in which a low capacity audio output capability is selected for reproduction of audio, selectively decreasing a maximum allowed RF transmit power level of at least one transmitter device included in the PCD.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
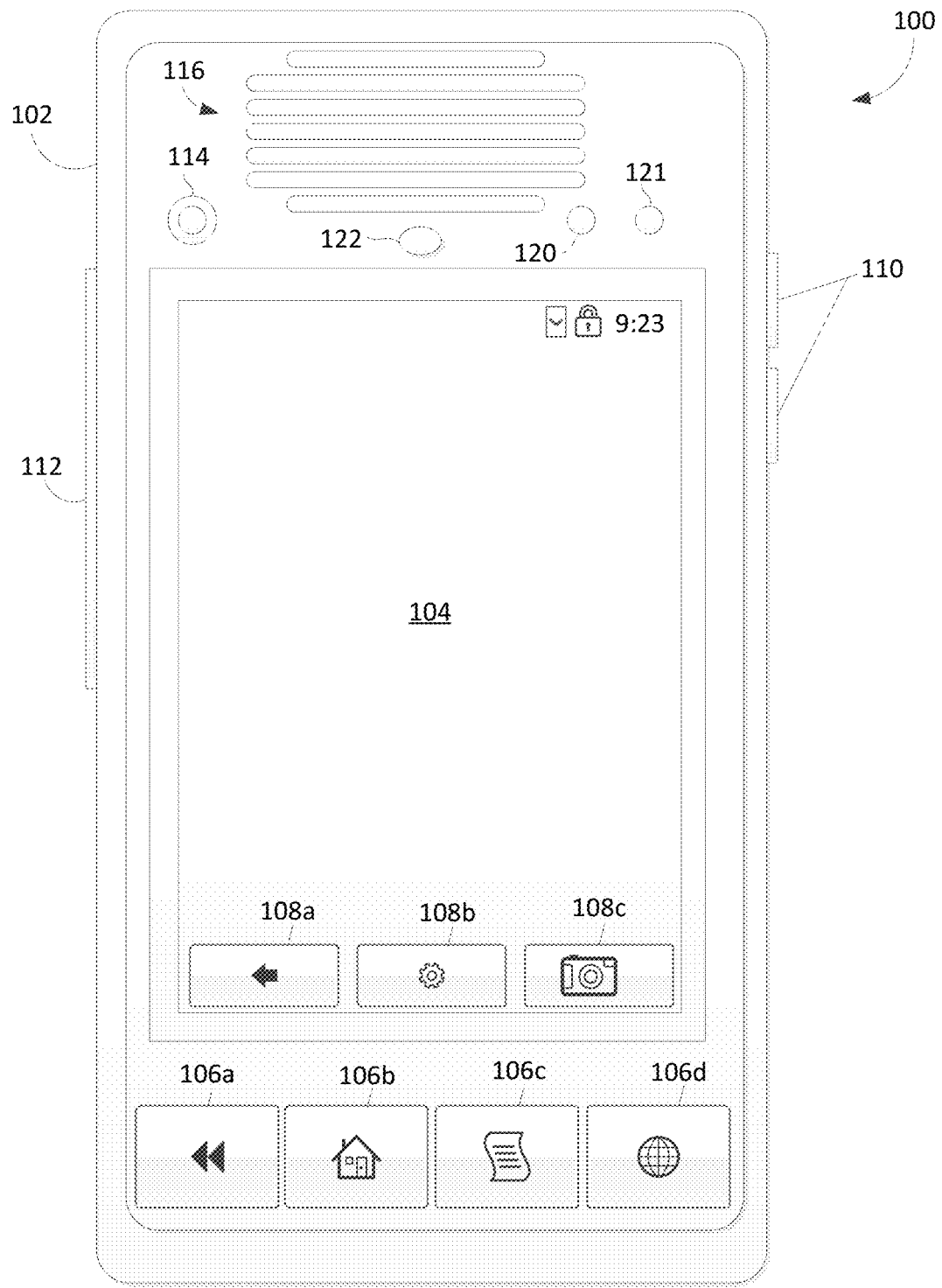
FIG. 1 is a drawing that is useful for understanding an exemplary handheld device which includes a loudspeaker and a handset speaker.

Referring now to FIG. 1, there is shown a portable communication device (PCD) 100 comprised of a chassis 102. The PCD 100 is typically a small device, sized to be easily carried by a user, and can be powered by replaceable or rechargeable batteries. To facilitate the various operating modes described herein, PCD 100 will include one or more user interface features to facilitate control of the device. For example, PCD 100 can include an interactive user display 104. The user display can be a touch screen display to facilitate implementation of one or more soft keys 108a, 108b, 108c for controlling various functions. The user display 104, also provides status information to the user. The user display 104 is also capable of displaying text data that is received by the PCD 100 from another communication device. A user display 104 as described herein can be implemented as an LCD display, LEDs, and/or other indication devices.

The PCD 100 can also include one or more hardware keys, such as keys 106a, 106b, 106c, 106d as shown. A push-to-talk button 112 is provided for communications transmit operations that are implemented using a PTT mode. The PCD further include volume controls 110 for varying an audio output volume for the device, transmit/receive indicator lamps 120, 121, microphone 114 and a speaker aperture 116 formed in chassis 102 which is acoustically coupled to a speaker cavity (not shown).

The PCD 100 is advantageously configured to facilitate two or more operating modes, and at least some of these modes may operate concurrently. In one operating mode, the PCD 100 operates as a land mobile radio (LMR) that communicates with other LMR devices using an RF interface. In one embodiment the PCD 100 can be configured to communicate in an analog or digital mode with Project 25 (P25) radios. The phrase "Project 25 (P25)", as used herein, refers to a set of system standards produced by the Association of Public Safety Communications Officials International (APCO), the National Association of State Telecommunications Directors (NASTD), selected Federal Agencies and the National Communications System (NCS). The P25 set of system standards generally defines digital radio communication system architectures capable of serving the needs of Public Safety and Government organizations. The PCD 100 can also be configured to communicate in analog mode with non-P25 radios using an RF interfaces.

The PCD 100 can be used in a "talk around" mode. "Talk around" mode allows communications between two LMR devices without any intervening equipment, e.g., a repeater, between the two devices. The PCD 100 can also be used in a conventional mode where two or more LMR devices communicate through the repeater (not shown) without trunking. The PCD 100 can further be used in a trunked mode where traffic is automatically assigned to one or more voice channels by the repeater. The PCD 100 can be configured to operate in a single frequency band, or alternatively may operate in a plurality of frequency bands. For example, an RF interface provided in the PCD 100 can be configured to support analog Frequency Modulation (FM) communications and P25 modulation (digital C4FM) communications in the following bands: 30-50 MHz Very High Frequency (VHF) LOw (LO) band; 136-174 MHz VHF High (Hi) band; 380-520 MHz Ultra High Frequency (UHF) band; and 762-870 MHz band. The PCD 100 can also be configured to operate in other frequency bands and with other modulation schemes.

The PCD 100 can also be configured to operate as a mobile telephony device. As such, the PCD 100 can communicate with other telephony devices using cellular base stations (not shown) which are provided as part of a cellular network. Mobile telephony operations are well known and therefore will not be described here in detail. However, it can be understood that PCD 10 can operate using any one of a plurality of well known cellular communications standards which are now known or may be known in the future. For example, the PCD 100 can be configured to communicate using various digital cellular technologies including LTE, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN).

The PCD can further include suitable facilities for communicating with the use of one or more wireless networks. These wireless networks can include wireless personal area networks (WPANs), wireless local area networks (WLAN), wireless mesh networks, and wireless wide area networks (WANs). In an exemplary embodiment, the PCD 100 communicates using the Bluetooth® protocol, or by means of some other short range wireless technology such as the 802.xx family of wireless communications standards, including Wi-Fi and ZigBee®. Alternatively, longer range wireless technologies such as may be used. The details of these technologies and the hardware required to implement transmitters and receivers that use these technologies are well known to persons skilled in the art, and thus, will not be described in great detail herein.

Figure 2:
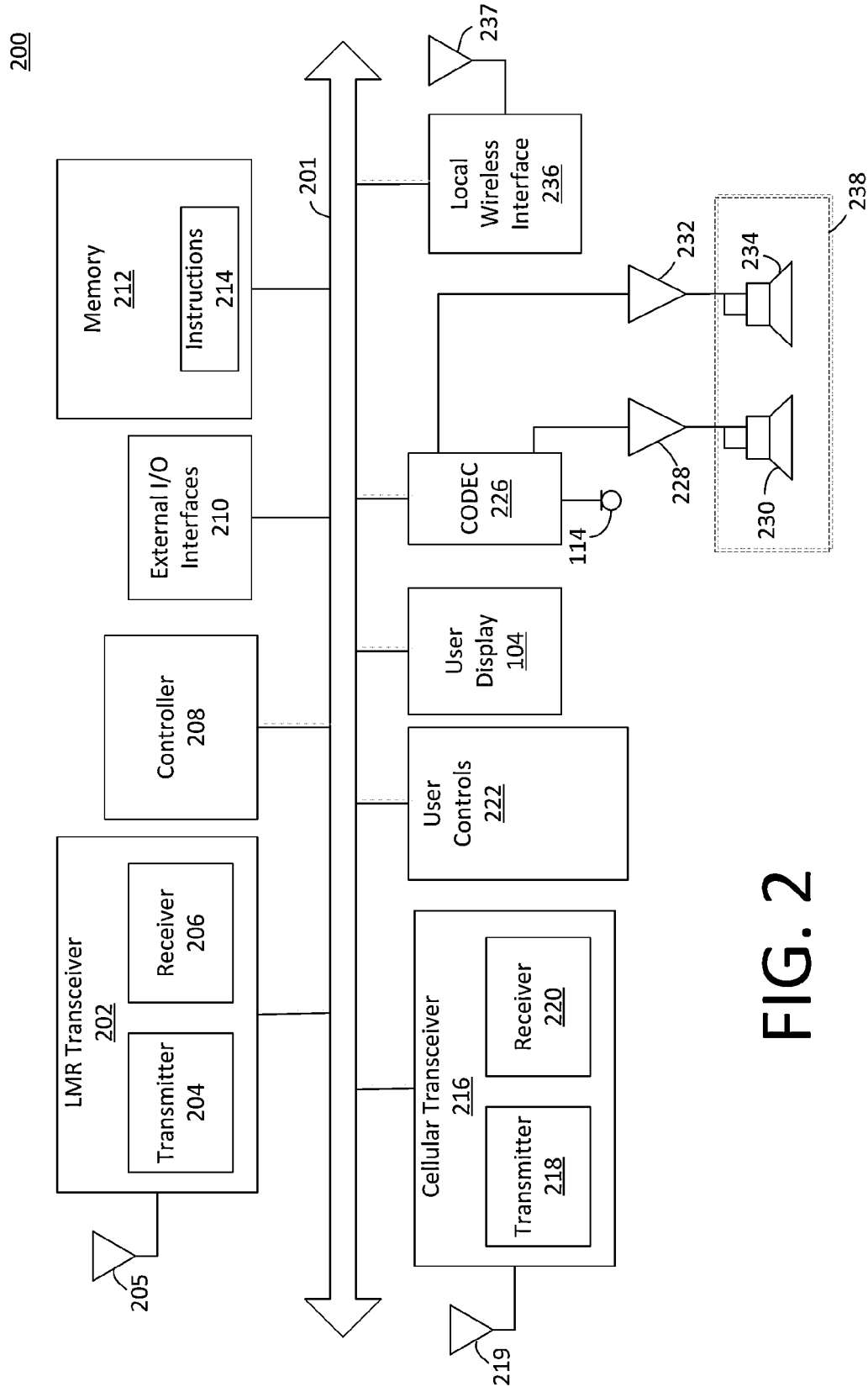
FIG. 2 is a functional block diagram of the exemplary handheld device in FIG. 1.

Referring now to FIG. 2, there is provided a more detailed block diagram 200 of PCD 100 in accordance with an embodiment of the present invention. The PCD 100 includes a controller 208. The controller 208 is comprised of at least one electronic processing device. For example, the controller 208 can include one or more microprocessors, microcontrollers, application-specific integrated circuits (ASICs) and programmable devices, such as a field programmable gate arrays (FPGAs) or complex programmable logic devices (CPLDs). The controller 208 may also have access to memory 212. The memory 212 may include volatile memory, such as static or dynamic RAM, and non-volatile memory, such as ferroelectric memory, magneto-resistive memory, flash memory, or a hard disk drive. The memory 212 may be used to store program instructions (e.g., software code) and other information required by the controller 208.

The controller 208 can communicate with memory 212 and one or more other component modules by means of at least one data communication bus 201. For example, the controller 208 can use bus 201 to communicate with one or more external I/O interfaces 210. Examples of external I/O interfaces include ports for USB, serial, Ethernet, and Firewire, among others. Such interfaces are well known to persons skilled in the art, and thus, will not be described in great detail herein. A user can interact with the controller 208 through the External I/O interfaces 210 to upgrade software code and to transfer information to and from the controller 208.

The memory 212 includes a computer-readable storage medium on which is stored one or more sets of instructions 214 (e.g., software code) configured to implement one or more of the methodologies, procedures, or functions described herein. The instructions 214 can also reside, completely or at least partially, within the controller 208. The controller 208 executes the program instructions to perform the functions assigned to the controller 208. Alternatively, the methods, procedures or functions described herein can be implemented using dedicated hardware implementations. Thus, the exemplary system is applicable to software, firmware, and hardware implementations.

The PCD 100 includes certain user controls which are represented collectively in FIG. 2 as user controls 222. The user controls include a plurality of buttons, switches and knobs that a user can use to interact with the controller 208. Accordingly, the user controls 222 can include PTT button 112 and volume controls 110. The user controls 222 can also include one or more soft keys (e.g. soft keys 108a-108c) and/or hardware-based keys 106a-106d. These keys can be used for selection of RF channel and/or frequency band on which communications are to be conducted. Additional soft keys can be presented on the display for purposes of implementing a DTMF keypad, and/or other user definable keys. The user controls 222 can also include a touch-screen keyboard, which can be used to enter text data to be stored or transmitted.

The PCD includes an LMR transceiver 202 comprised of a transmitter 204, receiver 206 and an antenna 206. There are many different possible methods of implementing the LMR transceiver 202. Although FIG. 2 illustrates only a single antenna 20, separate transmit and receive antennas may be used for the LMR transceiver. Multiple transmit and/or receive antennas may also be used to provide for diversity transmission and reception and/or beam-forming. Each of the transmitter 204, receiver 206 and the antenna 205, are well known to persons skilled in the art. Thus, these components will not be described here in detail. However, a brief discussion of the LMR transceiver architecture is provided to assist a reader in understanding the present invention.

An exemplary transmitter 204 includes a modulator and a local oscillator (not illustrated). The function of the transmitter 204 is to modulate data onto an RF signal derived from the local oscillator and amplify the modulated signal for transmission. The data to be modulated is provided by the controller 208 to the transmitter 204. The RF signal produced by the transmitter 204, which carries the data, is amplified using an RF power amplifier (not shown) and is coupled to the antenna 205. The RF signal is thereby broadcast to a repeater or to another LMR based communication device.

An exemplary receiver 206 includes a demodulator and a second local oscillator (not illustrated). An RF signal is received from the antenna 205 and amplified by a low noise power amplifier (not shown). The amplified received RF signal is then demodulated by the receiver 206 using the second local oscillator. Data is thereby extracted from the input RF signal. The extracted data is provided to the controller 208.

The controller 208 sets the frequency of the local oscillators and the gain of the power amplifiers. The frequency of the local oscillators is typically defined by the channel that the PCD 100 is set to. If the PCD 100 transmits and receives data using the same frequency, the RF interface may include only a single local oscillator (not illustrated) that is shared by the transmitter 204 and the receiver 206.

The cellular transceiver 216 includes a transmitter 218, a receiver 220 and an antenna 219. The controller 208 uses communication bus 201 to communicate data and control signals to and from the cellular transceiver 216. The cellular transceiver 216 functions in a manner similar to the LMR transceiver 202. However, the air interface and other communications processes implemented in cellular transceiver 216 will be based on a digital cellular communications protocol. The digital cellular communication protocol can be any of a variety of well known cellular communication protocols as outlined above. The cellular communication processes are implemented and controlled by controller 208 using instructions 214.

The local wireless interface 236 provides a wireless communications interface for communicating with a LAN or PAN type communication network using a local wireless link. In an exemplary embodiment, the local wireless interface 236 provides an interface that uses a WiFi® or Bluetooth® protocol as known in the art. An antenna 237 is provided to facilitate the wireless communications described herein using local wireless interface 236. Data and control signals are passed between the controller 208 and the local wireless interface 236 using communication bus 201. Instructions 214 can facilitate voice or data communications using local wireless interface 236. For example, local wireless interface 236 can be used to facilitate a voice over IP (VoIP) communication session as is known in the art.

PCD 100 is a multi-mode device that can facilitate voice and/or data communications using any one of LMR transceiver 202, cellular transceiver 216, or local wireless interface 236. Communication sessions using any of these transceivers 202, 216, 236 can occur during different non-overlapping serial time intervals, or can occur in overlapping time intervals such that communication sessions using different transceivers are facilitated concurrently. As an example of a plurality of serial communication sessions consider that one or more mobile telephony sessions can begin and such session(s) can be implemented using cellular transceiver 216 (cellular telephony session) and/or local wireless interface 236 (VoIP telephony session). Other options include voice calls over LTE (VoLTE calls). Such telephony session will end, after which an LMR communication session can be initiated using LMR transceiver 202. After the LMR communication session ends, a new telephony session can begin. Conversely, the LMR communication session can occur concurrently during all or a portion of the time associated with the mobile telephony session. The various communications sessions can occur asynchronously so that it is not known in advance when one communication session will end and one will begin.

Different types of communication sessions can involve different ways of utilizing the PCD 100. For example, an LMR communication session is typically a half-duplex type session in which bi-directional communication can occur as between two communication devices, but the wherein the parties to such communication alternately take turns transmitting and receiving. As such LMR communications are usually implemented using a PTT type arrangement in which a user presses a PTT button when it is desired to transmit a voice communications. The user releases the PTT button to listen to received voice communications. During LMR communication sessions and PTT type communications in particular audio is commonly reproduced using a high capacity loudspeaker so that received audio can be heard while the device is held some distance away from the user's ear. The loudspeaker must be capable of relatively high levels of output so that the received audio can be overheard even in a noisy environment. Conversely, mobile telephony sessions are frequently conducted with the mobile handset placed directly on or adjacent to the user's ear. In such a scenario, much lower sound levels are usually sufficient for purposes of allowing the user to hear received audio. Accordingly, a small, low capacity handset speaker is commonly used during mobile telephony sessions to reproduce received audio signals.

A PCD 100 as described herein can include two separate transducers or speakers for converting electrical signals into sound. More particularly, the PCD 100 will include a handset speaker 230 and a loudspeaker 234 within the chassis 102. Driver circuitry 228 is used to provide audio drive signals for handset speaker 230 and driver circuitry 232 is used to provide audio drive signals for loudspeaker 234. The driver circuitry 228 and handset speaker 230 are optimized for the kinds of lower volume audio signals typically required during telephony sessions when the handset is placed directly on or adjacent to the user's ear. The driver circuitry 232 and loudspeaker 234 are optimized for the much larger amplitude audio signals that are commonly required during LMR or PTT communication sessions. Accordingly, the loudspeaker 234 is sometimes referred to herein as having a "high capacity audio capability" in order to differentiate it from the handset speaker 230, which is only designed for reproduction of lower amplitude audio signals. To minimize the size of the PCD 100, both speakers are disposed in a shared or common speaker cavity 238 which is acoustically coupled to the speaker aperture 116. The volume level of handset speaker 230 and loudspeaker 234 can be independently adjusted using volume controls 110.

Analog audio signals from microphone 114 are provided to audio CODEC 226 where the analog audio signals are encoded in a digital format. Audio CODEC devices are well known in the art and therefore will not be described here in detail. However, it will be appreciated that CODEC 226 can encode the analog audio signals using any encoding protocol that is suitable for a particular type of communication session. For example, the CODEC can encode received analog audio from microphone 114 using the Improved Multiband Excitation (IMBE) vocoder system as defined by P25 standards. Alternatively, other voice coding methods such as Advanced Multiband Excitation (AMBE) or the Adaptive Multi-rate codec can be used for this purpose as may be appropriate for other types of communication sessions. The encoded audio signals are provided from CODEC 226 to controller 208 where they can be formatted and arranged for transmission using LMR transceiver 202, cellular transceiver 216, or local wireless interface 236. The CODEC 226 can also function to convert encoded audio data from controller 208 to analog audio signals which are suitable for use as input signals for driver circuits 228, 232. The controller 208 can receive such encoded audio data from any one of the LMR transceiver 202, cellular transceiver 216 or local wireless interface 236 according to a particular communication session. In some embodiments, one or both of audio driver circuits 228, 232 can be integrated into a single device comprising the CODEC 226.

During telephony-like operations the PCD 100 is held in a manner common to telephony devices, with the speaker aperture 116 placed adjacent to the user's ear. However, this scenario presents a problem when transitioning from a mobile telephony communication session to an LMR communication session (or to a multimedia application session). When transitioning to an LMR communication session (or multimedia application session) it will frequently be desirable to use the loudspeaker 234 to produce audio at sound levels that are much higher in magnitude as compared to those sound levels which are produced during the telephony session. This transition from the relatively low sound levels associated with driver circuitry 228 and handset speaker 230 to the much higher sound levels of driver 232 and loudspeaker 234, could damage the operator's hearing. This risk is particularly great under circumstances where the loudspeaker volume level is set to maximum. Audio events and transitions from one type of communication session (e.g. mobile telephony) to another type of communication session (LMR communication) can occur asynchronously and without operator interaction or warning. For example, an incoming LMR communication can be received immediately upon termination of a mobile telephony session, and before the user has the opportunity to move the phone away from his ear.

Figure 3:
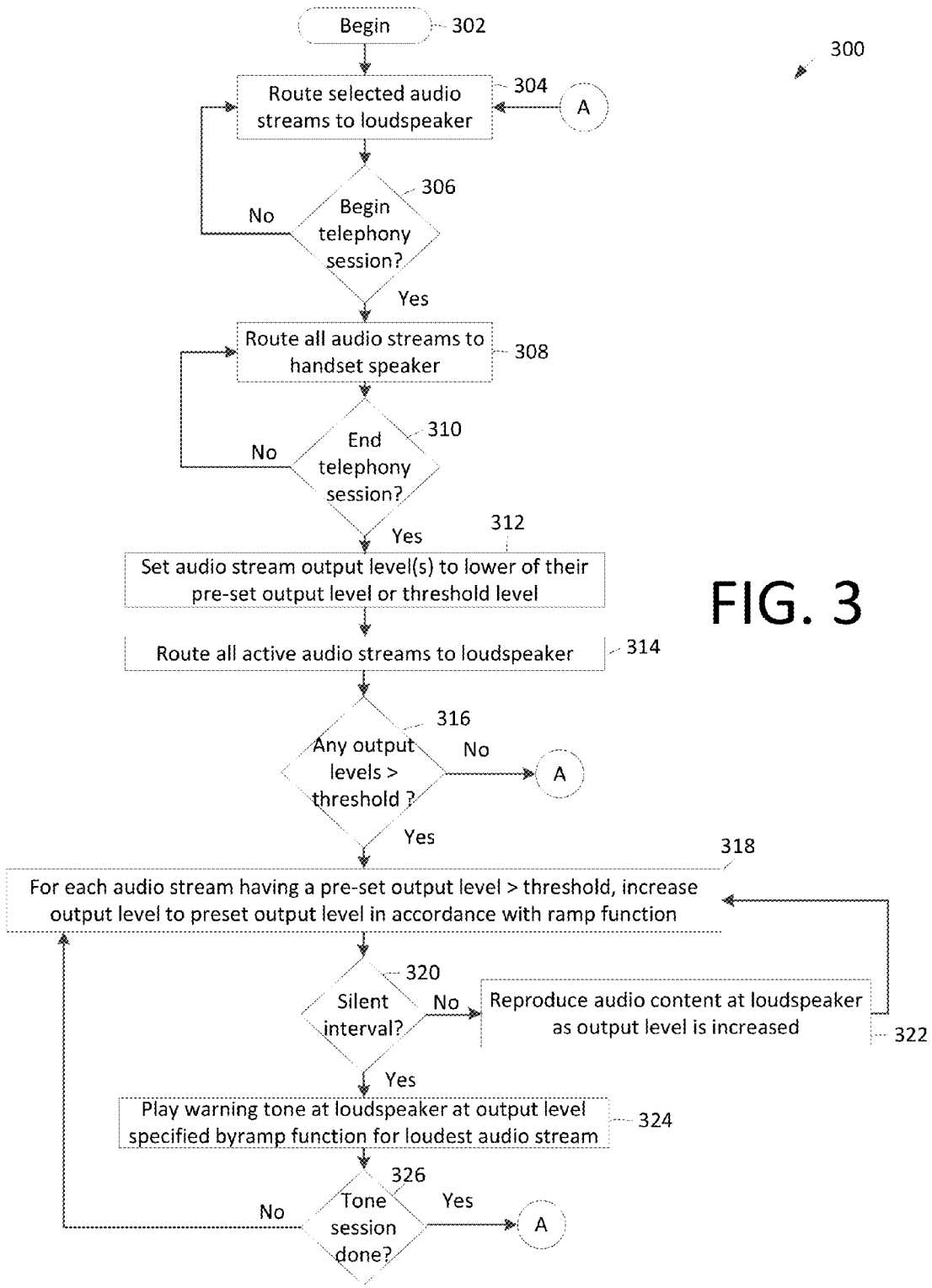
FIG. 3 is a flowchart that is useful for understanding a method for preventing acoustic shock.
Figure 4:
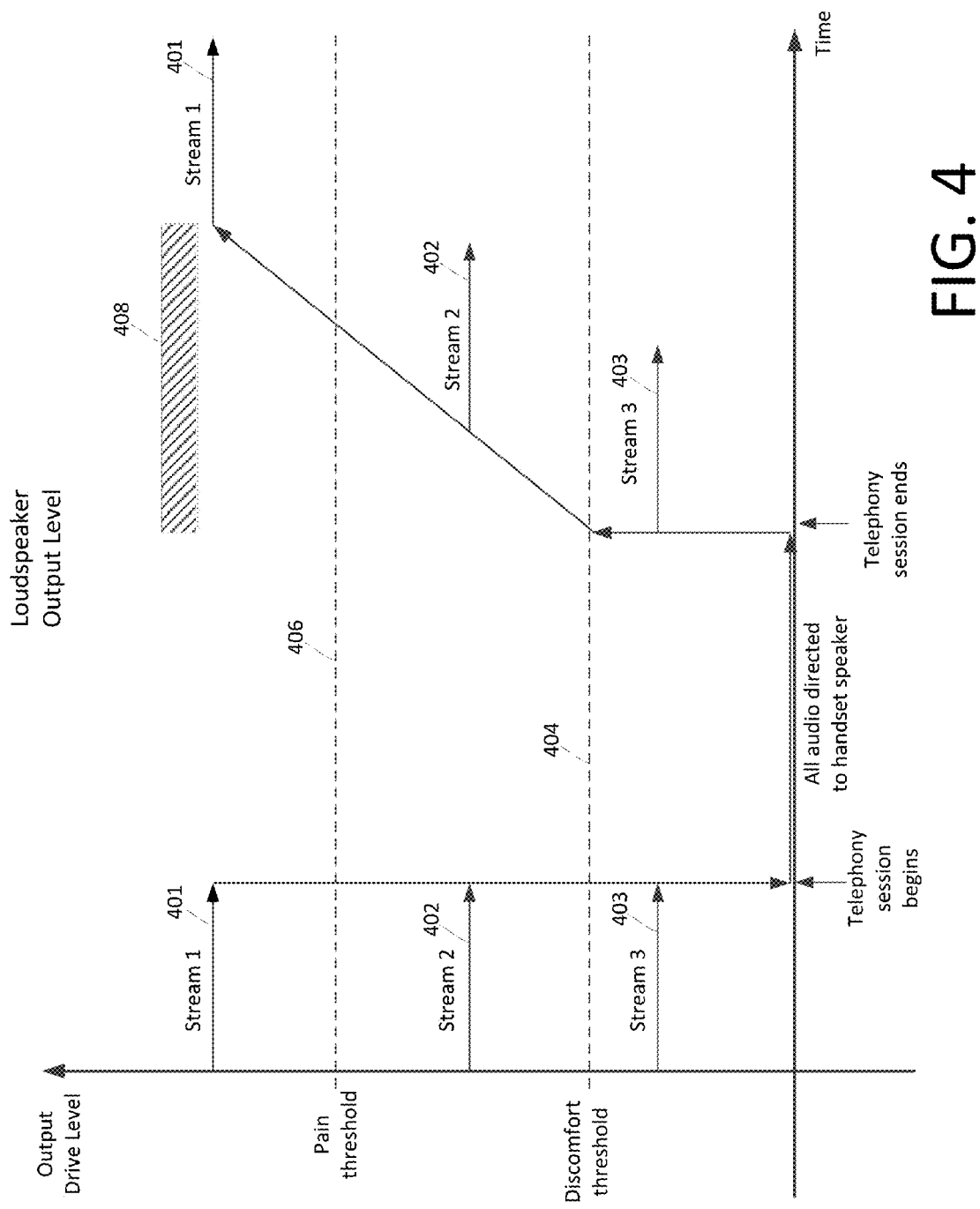
FIG. 4 is a diagram that shows loudspeaker output drive level as a function of time for three separate audio streams.

Referring now to FIG. 3 there is shown a flowchart 300 that is useful for understanding a process for controlling a plurality of audio streams applied to a headset speaker 230 and a loudspeaker 234. The process can be best understood with reference to FIG. 4 which graphically shows loudspeaker output drive level as a function of time for three separate audio streams With reference to FIG. 3, the process begins at 302 and continues to 304 where one or more audio streams are routed to a loudspeaker, such as loudspeaker 234. This concept is illustrated in FIG. 4 which shows loudspeaker output drive levels for one or more audio streams 1, 2 and 3 are each respectively set at some pre-selected loudspeaker output drive level 401, 402, 403. The pre-selected loudspeaker output drive level 401, 402, 403 for each audio stream is usually chosen by the user but the invention is not limited in that regard. It should be appreciated that more or fewer than three audio streams may be reproduced at the loudspeaker 234 but three audio streams are shown in FIG. 4 to help explain how the system handles audio streams having various different pre-set output drive levels.

Notably, a pre-selected loudspeaker output drive level (e.g., loudspeaker output drive level 402) can exceed a discomfort threshold 404 when audio content is present with respect to a particular audio stream. The discomfort threshold 404 can be understood as a drive level that will cause user listening discomfort when the loudspeaker 234 is positioned adjacent to the user's ear (as would be the case during a conventional mobile telephony session) and audio content is played at such level. The discomfort threshold is somewhat subjective but is typically about 120 dB SPL relative to the threshold of hearing at 0 dB SPL. A preselected loudspeaker output drive level can also exceed a pain threshold 406. A pain threshold can be understood to be an output drive level at which a user will experience pain or potential hearing damage if the loudspeaker is held to the user's ear while audio is being played at such level. This sound level is also somewhat subjective but can be said to be about 140 dB SPL relative to the threshold of hearing.

Audio stream 1, 2 and 3 represent audio streams derived from signals received during a communication session using one or more of LMR transceiver 202, cellular transceiver 216 or local wireless interface 236. One or more such audio streams can also be received during a VoLTE session. Notably, each of the audio streams 1, 2 and 3 can be discontinuous, meaning that a received voice transmission can be temporarily interrupted or can contain periods of silence during which no substantive audio content is present. Accordingly, it should be understood that the plots for stream 1, stream 2, and stream 3 shown in FIG. 4 represent loudspeaker output drive level associated with each particular audio stream, and do not imply the absence or presence of audio content for a particular stream at any given time. Not all of audio streams 1, 2, and 3 need be present as loudspeaker outputs for purposes of the present invention. In an exemplary scenario, a single discontinuous audio stream (e.g. audio stream 1 or audio stream 2) can be derived from transmission received by LMR transceiver 202. The single discontinuous audio stream can be reproduced using the loudspeaker 230.

At 306 a determination is made as to whether a mobile telephony session has begun. For purposes of the present invention, a mobile telephony session will mean a communication session during which PCD 100 is configured to present a received audio stream to the user by means of the low output headset speaker 230. For example, a default configuration for the PCD 100 can be set so as to route received voice communications to headset speaker 230 during any mobile telephony session (e.g. cellular communication session or VoIP communication session). Alternatively, the mobile telephony session can be thought of as beginning when an audio stream associated with an ongoing communication session is re-routed from the loudspeaker to the headset speaker. In the exemplary scenario referenced above, a telephone call can be received or initiated by the PCD 100 while the user is monitoring transmissions received by LMR transceiver 202.

If a mobile telephony session has begun (306: Yes) then the process continues on to 308 at which point any audio streams (e.g. audio streams 1, 2, and 3) are routed to the handset speaker 230. As shown in FIG. 4, the output drive level for loudspeaker 234 is set to zero for any active audio streams 1, 2 and 3 when the telephony session begins. During the telephony session, all active audio streams are reproduced, if at all, through the handset speaker 230 at some volume level which is pre-set or chosen by the user. The output level from the handset speaker 230 will generally be substantially less than the output level from the loudspeaker 234. The audio stream associated with the telephony session (not shown in FIG. 4) will also be reproduced at the handset speaker 230.

During the telephony session, audio streams reproduced at the headset speaker will be reproduced in accordance with a preset configuration. The pre-set configuration can specify that all audio streams are to be mixed and reproduced concurrently at headset speaker 230. Alternatively, one audio stream can be given priority such that the other audio streams will be muted when audio content is present on the audio stream having priority. Regardless, any audio stream played during this time period will be reproduced using the handset speaker 230 at some relatively low level appropriate for the headset speaker. During this time, it is expected that the handset speaker will be positioned so that it is directly adjacent to the user's ear. Accordingly, the handset speaker level will be sufficiently low so as to avoid user discomfort, pain or hearing injury.

At 310 a determination will be made as to whether the telephony session has ended. If not (310: No), then the process returns to 308 and all audio streams will continue to be routed to the handset speaker as described above. If the telephony session has ended (310: Yes), then the process continues to 312 where all audio stream output drive levels are set to the lower of their pre-set output drive levels or to a predetermined threshold level. In one embodiment of this invention shown in FIG. 4, this predetermined threshold level is chosen to be the discomfort threshold 404. Accordingly, FIG. 4 shows that when the telephony session ends, the loudspeaker output drive level for audio stream 3 is returned to its pre-set level, whereas the output drive levels for audio streams 2 and 3 are initially set to the discomfort threshold level 404. Still, it should be understood that invention is not limited in this regard and the predetermined threshold level can be somewhat higher or lower as compared to the discomfort threshold. In step 314, any active audio streams are again routed to the loudspeaker 324. The process then continues at 316, where a determination is made as to whether a pre-set output drive level for any of the audio streams exceeds the threshold level. If not, then the process returns to step 304. However, if any of the pre-set audio output drive levels does exceed the threshold (316: Yes) then the process continues on to 318. As an example of such a scenario, it can be observed in FIG. 4 that the preset output drive level for audio streams 1 and 2 does in fact exceed the discomfort threshold level.

At 318 the process continues by adjusting the output drive levels for each of the audio streams that have a preset output drive level exceeding the threshold level. More particularly, for each audio stream having a preset output drive level that is greater than the threshold level, a ramp function is used to gradually increase the output drive level over time until the actual output drive level for that particular audio stream matches its preset level. This is graphically illustrated in FIG. 4 which shows how the loudspeaker output drive levels for audio streams 1 and 2 are gradually increased in accordance with a ramp function. Notably, the actual loudspeaker output drive level for each particular audio stream will increase according to the ramp function until it arrives at the preset output drive level assigned to that particular audio stream.

While the ramping process of 318 continues, periodic checks are made at 320 to determine whether a silent interval exists. A silent interval can comprise a temporary interruption in an RF transmission as is common in asynchronous PTT voice communications. Alternatively, a silent interval can comprise a period during which an RF transmission from another station is actively being received, but there is no voice content is present. This can occur, for example, when a speaker pauses in his speech during a voice communication but continues to depress a PTT button. In the absence of a silent interval (320: No) the PCD 100 will at 322 reproduce audio content associated with a particular audio stream at loudspeaker 234 as the output drive level for one or more audio streams continues to be ramped up. The audio content for such audio stream will be reproduced at the output drive level of the loudest audio stream as then specified by the ramp function.

Upon occurrence of a silent interval (320: Yes), there is a risk that a user of the PCD 100 will not appreciate that the loudspeaker output drive level associated with one or more audio streams is ramping up. In such a scenario, the user may be at risk for acoustic shock when the silent interval finally terminates. Accordingly, upon occurrence of such a silent interval at 320 the process continues at 324 by reproducing at loudspeaker 234 a series of warning tones during a tone session 408. The warning tones are advantageously reproduced at loudspeaker 234 at a loudspeaker output drive level as then specified by the ramp function. More particularly, the warning tones will be reproduced at a loudspeaker output drive level then specified by the ramp function for the loudest audio stream. The warning tones thus serve the purpose of alerting the user to the risk of acoustic shock. In some embodiments, the warning tones are always played, without necessarily detecting whether there is a silent interval. As an added feature for alerting a user, the warning tones described herein can be combined with other types of alerts, such as a vibrate alert. The intensity of the vibrate alert can be constant or can be ramped up over the period of time corresponding to the tone session 408 in a manner similar to the warning tones.

In step 326 a determination is made as to whether the tone session is completed. Generally the tone session will continue for some period of time which will at least include the period during which the ramp function is gradually increasing the loudspeaker output drive level. As an example, the tone interval can be as short as 1 or 2 seconds. Alternatively, the tone interval can be as long as 10 seconds. Still, the invention is not limited to a tone interval of any particular length. If the tone session is not yet complete, the process reverts to 318 where the process continues. If the tone session is complete, then the process returns to 304.

The ramp function illustrated in FIG. 4 is shown to be a smooth linear ramp. However, it should be understood that a ramp function as defined herein is not so limited. For example a ramp function can be a non-linear function. The ramp can also be discontinuous (a series of steps) provided that the steps are in small increments so that the output drive level is increased only gradually over time. The output drive level of each audio stream can be controlled by selectively varying the gain of driver circuitry 232 or by controlling the output of CODEC 226.

Figure 5:
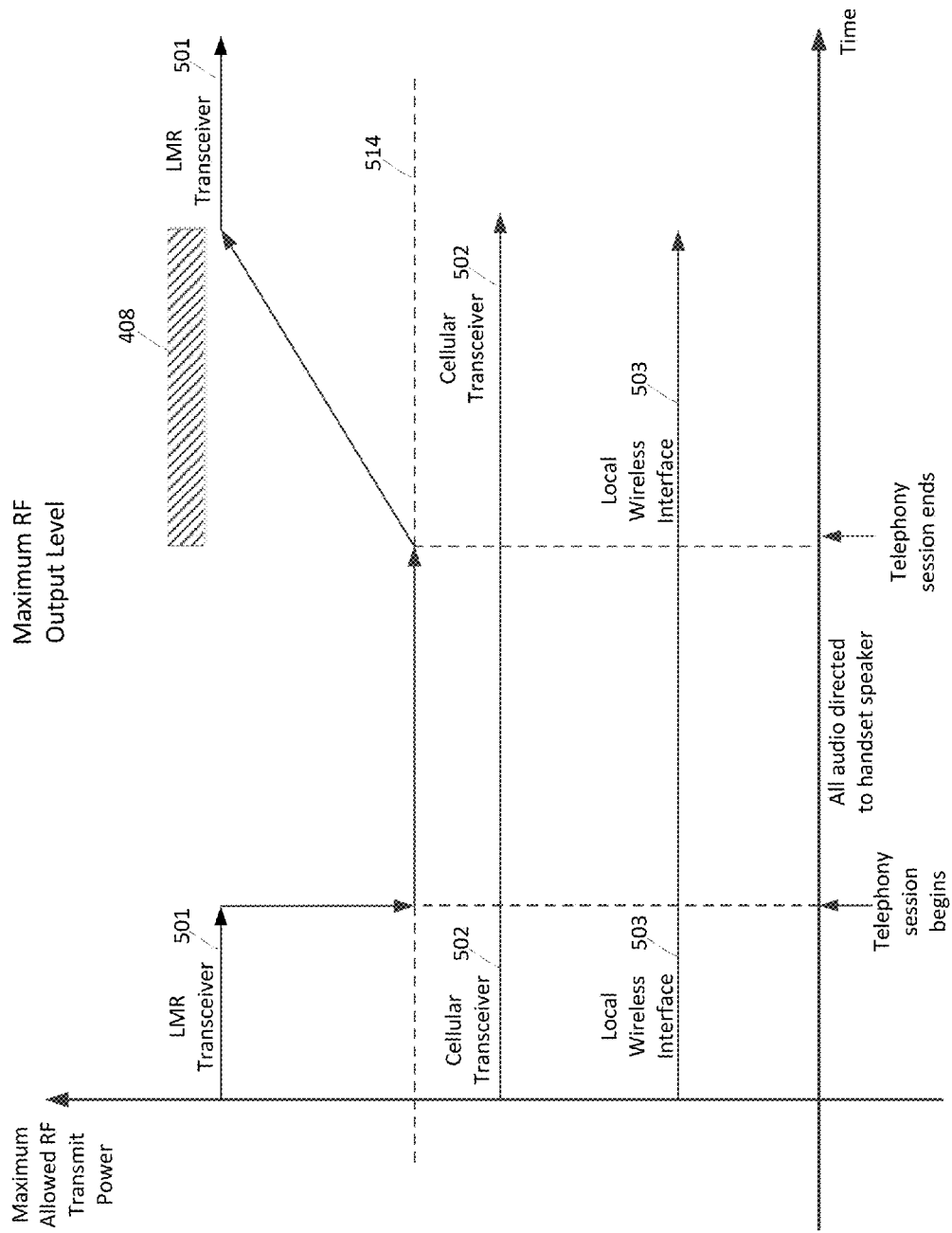
FIG. 5 is a diagram that is useful for understanding an RF safety feature that can be used in conjunction with the method for preventing acoustic shock.

The inventive arrangements can be combined with additional safety features that are intended to safeguard users from risks that arise in association with multimode devices as described herein. For example, such risks can arise when transitioning from LMR communication sessions which frequently involve relatively high RF power levels (e.g. 5 W), to mobile telephony sessions that are conducted using cellular or network type communication systems and which typically involve much lower RF power levels. During an LMR communication session where RF output power levels are relatively high, the PCD 100 is preferably not positioned directly adjacent to the user's ear, as such a scenario will expose the user's brain to relatively high intensity RF fields. In order to avoid such exposure, RF output power levels can be modified in a manner similar to that of loudspeaker output drive level. Such an arrangement is illustrated in FIG. 5, which shows that maximum RF output power levels 501, 502, 503 for one or more of the LMR transceiver 202, cellular transceiver 216 and local wireless interface 236 can be selectively restricted during periods associated with a telephony session.

In the exemplary embodiment shown in FIG. 5, RF output power levels 502, 503 associated with the cellular transceiver 216 and local wireless interface 236 will generally remain below an RF safety threshold 514 that is considered safe for usage when the PCD 100 is placed adjacent to the user's head. However, maximum RF output level 501 associated with LMR transceiver 202 can potentially exceed RF safety threshold 514 if the PCD 100 is placed adjacent to the user's head. Accordingly, the maximum allowed RF transmit power 501 for the LMR transceiver can be reduced during a mobile telephony session as shown in FIG. 5. At the conclusion of the mobile telephony session, the maximum allowed RF transmit power can be gradually ramped up as shown in accordance with a ramp function. The period of gradual ramp up in maximum allowed RF output power will advantageously coincide with the period during which the output audio and/or warning tones are increasing in volume as previously described. Accordingly, FIG. 5 shows that the increase in maximum allowed transmit power 501 occurs concurrently with the warning tone session 408.

When the foregoing RF power control feature is combined with the other inventive arrangements as described herein, the gradually increasing loudness of the reproduced audio stream and/or warning tones will encourage users to move the PCD 100 away from their ear while the maximum transmitted RF power level is being gradually ramped up. In some embodiments, a proximity sensor 122 (e.g. a heat sensor) can be included in the PCD to detect when the device is held close to the user's head, and the maximum RF output levels from PCD 100 can be restricted to the RF safety threshold 514 during such time periods. In other embodiments, the RF output level restrictions based on the proximity sensor 122 can be further conditioned upon other factors, such as the detection of an ongoing or recently terminated telephony session. Other embodiments are also possible in which one or more such features are combined with the acoustic shock protection methods described herein. Also, it should be appreciated that while acoustic shock frequently occurs in the course of a telephony session, the inventive arrangements are useful for any scenario in which the user is listening to audio through the handset speaker. Accordingly, the phrase "telephony session" can actually include any such session where the handset speaker (as opposed to the loudspeaker) is being used for listening purposes.

In certain scenarios, the RF protection aspects of the present invention can be applied independently of the methods described herein for preventing acoustic shock. In such scenarios, a method is provided for protecting a user from RF energy associated with a portable communication device (PCD). The method involves generating in the PCD at least one audio stream and reproducing the at least one audio stream using a speaker in the PCD (e.g., a loudspeaker) having a high capacity audio output capability. Thereafter, responsive to the initiation of a listening session in which a low capacity audio output capability is selected for reproduction of audio, a maximum allowed RF transmit power level of at least one transmitter device included in the PCD is selectively decreased. The decrease in RF transmit power level is to reduce potential harmful effects of RF energy upon a user when the PCD is used in close proximity to a user's head. In this regard, it is presumed that a low audio session corresponds to periods during which the PCD is placed directly adjacent to the user's head. The RF transmit power level is increased after termination of the low audio listening session to achieve maximum communication range. For example, the RF transmit power level can be gradually increased to the maximum allowed RF transmit power level during a period of time following termination of the low audio listening session.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for preventing acoustic shock in a portable communication device (PCD), comprising
    providing in the PCD a plurality of audio streams including a telephony audio stream and at least a second audio stream;
    reproducing the second audio stream using a loudspeaker in the PCD having a high capacity audio output capability;
    responsive to the occurrence of a telephony session, re-routing the second audio stream from the loudspeaker to a handset speaker in the PCD having a low capacity audio output capability, and reproducing the telephony audio stream and the second audio stream using the handset speaker;

upon termination of the telephony session, re-routing the second audio stream from the handset speaker to the loudspeaker;

subsequent to said re-routing gradually increasing an audio output drive level of the second audio stream over a period of time in accordance with a predetermined ramp function until the audio output drive level of the second audio stream corresponds with the predetermined output drive level setting for the second audio stream; and during said period of time, selectively reproducing with the loudspeaker a series of warning tones at the audio output drive level for the second audio stream as determined by the predetermined ramp function.

2. The method according to claim 1, wherein the second audio stream is discontinuous so as to include one or more intervals of audio content and intervals of silence, the method further comprising selectively reproducing the warning tones with the loudspeaker only during the intervals of silence.

3. The method according to claim 1, wherein the second audio stream is discontinuous so as to include one or more intervals of audio content and intervals of silence, and wherein the method further comprises suspending reproduction of the warning tones during the intervals of audio content, and instead reproducing the audio content at the audio output drive level as determined by the ramp function.

4. The method according to claim 1, further comprising receiving at the telephony device a wireless communications signal from a land mobile radio (LMR) communication system which includes the second audio stream.

5. The method according to claim 1, further comprising receiving at the telephony device a wireless communication signal from a base station of a cellular communication system which includes the telephony audio stream.

6. The method according to claim 1, further comprising:
providing at the device a third audio stream;
upon termination of the telephony session, routing the third audio stream to the loudspeaker; and
gradually increasing the audio output drive level of the third audio stream in accordance with the predetermined ramp function.

7. The method according to claim 6, further comprising selectively reproducing with the loudspeaker a series of warning tones upon said termination of the telephony session, and reproducing the warning tones at a tone audio output drive level determined by one of an output drive level of the second audio stream and the output drive level of the third audio stream.

8. The method according to claim 7, wherein the tone audio output drive level corresponds to the louder of the second audio stream and the third audio stream.

9. The method according to claim 1, further comprising selectively reducing during the telephony session a maximum allowed RF transmit power level of at least one transmitter included in said PCD.

10. The method according to claim 9, further comprising gradually increasing the maximum allowed RF transmit power level during said period of time following termination of the telephony session.

11. The method according to claim 1, further comprising disposing said loudspeaker and said handset speaker in a shared cavity.

12. A method for protecting a user of a portable communication device (PCD), comprising generating in the PCD a plurality of audio streams including a telephony audio stream and at least a second audio stream;

reproducing the second audio stream using a loudspeaker in the PCD having a high capacity audio output capability;

responsive to the occurrence of a telephony session, re-routing the second audio stream from the loudspeaker to a handset speaker in the PCD having a low capacity audio output capability, and exclusively reproducing the telephony audio stream and the second audio stream using the handset speaker;

upon termination of the telephony session, re-routing the second audio stream from the handset speaker to the loudspeaker;

subsequent to said re-routing gradually increasing an audio output drive level of the second audio stream over a period of time in accordance with a predetermined ramp function until the audio output drive level of the second audio stream corresponds with the predetermined output drive level setting for the second audio stream; and during said period of time, selectively increasing a maximum allowed RF transmit power level of at least one transmitter included in the PCD.

13. The method according to claim 12, further comprising selectively decreasing said maximum RF transmit power level during said telephony session.

14. The method according to claim 12, further comprising gradually increasing the maximum allowed RF transmit power level during said period of time following termination of the telephony session.

15. The method according to claim 12, further comprising selectively reproducing with said loudspeaker during said period of time a series of warning tones at an audio output drive level determined by the predetermined ramp function.

16. The method according to claim 15, wherein the second audio stream is discontinuous so as to include one or more intervals of audio content and intervals of silence, the method further comprising selectively reproducing the warning tones with the loudspeaker only during the intervals of silence.

17. The method according to claim 15, wherein the second audio stream is discontinuous so as to include one or more intervals of audio content and intervals of silence, and wherein the method further comprises suspending reproduction of the warning tones during the intervals of audio content, and instead reproducing the audio content at the audio output drive level as determined by the ramp function.

18. A portable communication device (PCD), comprising at least one processing device configured to generate a plurality of audio streams including a telephony audio stream and at least a second audio stream;

cause the second audio stream to be reproduced using a loudspeaker in the PCD having a high capacity audio output capability;

responsive to the occurrence of a telephony session, cause the re-routing of the second audio stream from the loudspeaker to a handset speaker in the PCD having a low capacity audio output capability, and causing the telephony audio stream and the second audio stream to be reproduced using the handset speaker;

re-route the second audio stream from the handset speaker to the loudspeaker upon termination of the telephony session;

subsequent to said re-routing gradually cause an audio output drive level of the second audio stream to increase over a period of time in accordance with a predetermined ramp function until the audio output drive level of the second audio stream corresponds with the predetermined output drive level setting for the second audio stream; and during the period of time, cause the loudspeaker to reproduce a series of warning tones at the audio output drive level for the second audio stream as determined by the predetermined ramp function.

19. A portable communication device (PCD) with user protection, comprising at least one processing device configured to generate in the PCD a plurality of audio streams including a telephony audio stream and at least a second audio stream;

cause the second audio stream to be reproduced using a loudspeaker in the PCD having a high capacity audio output capability;

responsive to the occurrence of a telephony session, cause re-routing of the second audio stream from the loudspeaker to a handset speaker in the PCD having a low capacity audio output capability, and to exclusively reproduce the telephony audio stream and the second audio stream using the handset speaker;

upon termination of the telephony session, cause re-routing of the second audio stream from the handset speaker to the loudspeaker;

subsequent to said re-routing, cause a gradual increase in an audio output drive level of the second audio stream over a period of time in accordance with a predetermined ramp function until the audio output drive level of the second audio stream corresponds with the predetermined output drive level setting for the second audio stream; and during the period of time, cause the loudspeaker to reproduce a series of warning tones at a tone audio output drive level determined by the predetermined ramp function.

20. The PCD according to claim 19, wherein said at least one processing device is further configured to selectively increase during the period of time, a maximum allowed RF transmit power level of at least one transmitter included in the PCD.

21. A method for protecting a user of a portable communication device (PCD), comprising:

generating in the PCD at least one audio stream;

reproducing the at least one audio stream using a loudspeaker in the PCD having a high capacity audio output capability;

responsive to the initiation of a low audio listening session in which only a low capacity audio output capability is selected for reproduction of audio, selectively decreasing an output drive level for a loudspeaker and a maximum allowed RF transmit power level of at least one transmitter device included in the PCD; and selectively increasing the output drive level for the loudspeaker and a maximum allowed RF transmit power level of the at least one transmitter device included in the PCD during a period of time following termination of the low audio listening session.

22. The method according to claim 21, further comprising gradually increasing the maximum allowed RF transmit power level during a period of time following termination of the low audio listening session.

* * * * *